United States Patent Office 3,671,359
Patented June 20, 1972

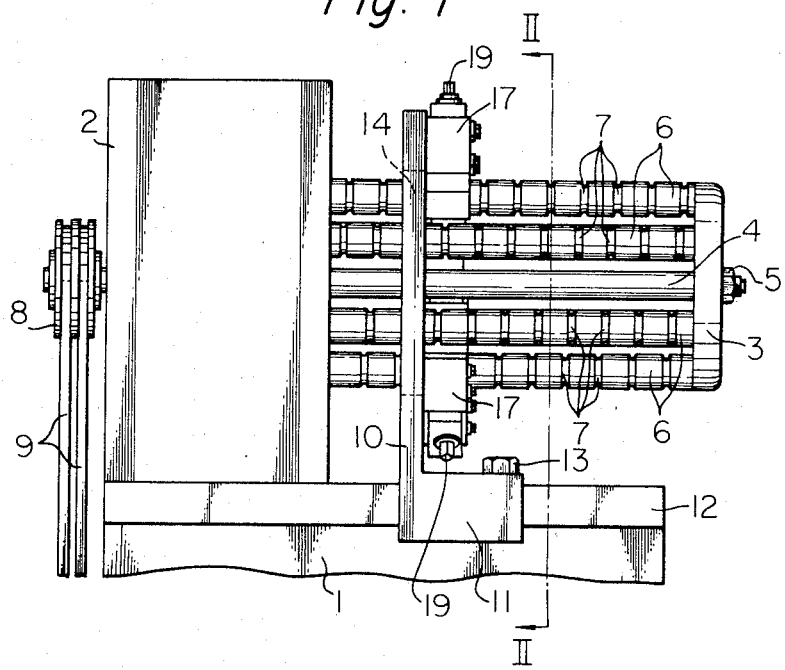
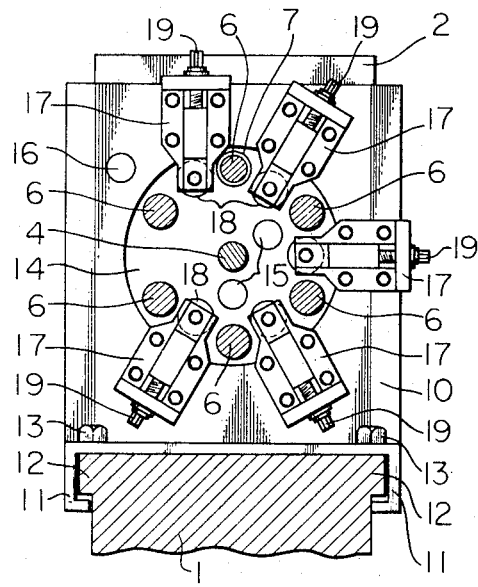
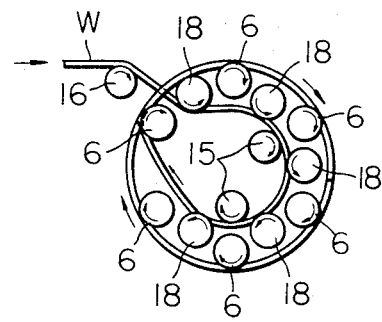

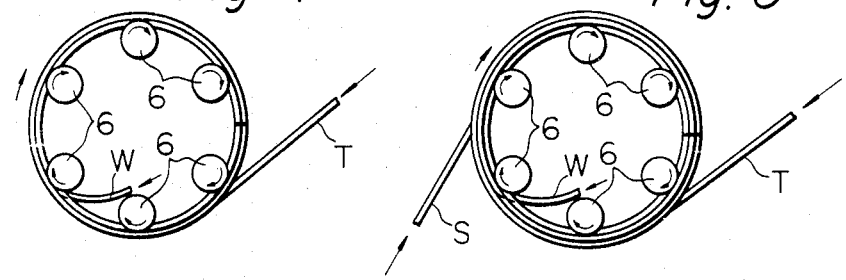
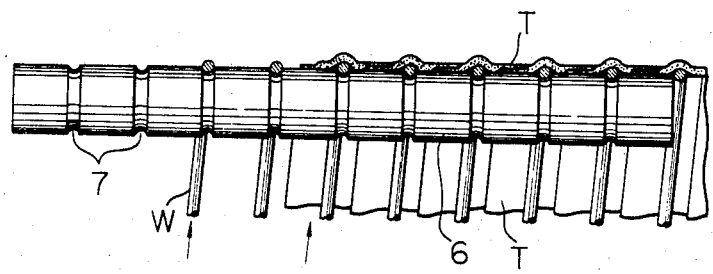
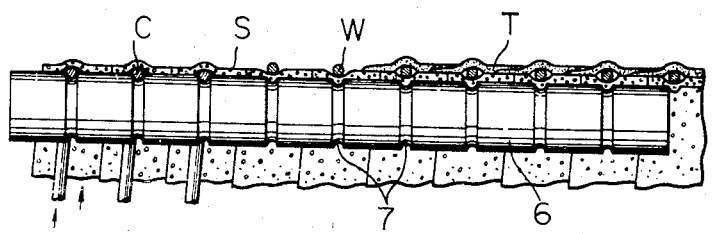

3,671,359
APPARATUS FOR CONTINUOUSLY MAKING A HOSE
Hiroyuki Sawada, 243 Sanjo-cho, Ashiya-shi, Japan; and Saburo Miyawaki, 21–11 Koshienguchikitamachi; and Hajime Ishikawa, 5–25, 2-chome Wakakusa-cho, both of Nishinomiya-shi, Japan
Filed Dec. 23, 1969, Ser. No. 887,673
Int. Cl. B65h 55/04
U.S. Cl. 156—436                    6 Claims

ABSTRACT OF THE DISCLOSURE

An apparatus for continuously making a hose which comprises a plurality of similar rolls each formed with helical grooves thereon and arranged so as to collectively form a cylindrical surface defined by the outer peripheries thereof, the grooves on each of these rolls being disposed so that they are successively axially offset from the grooves on the preceding roll by a dimension derived by dividing the distance between axially adjacent grooves by the number of the rolls, so that a hard resilient wire supplied into the grooves on the rotating rolls is formed into a coil while a tacky strap of hose wall material is entrained onto the wire, so that the adjacent edges of the tacky hose wall material helically rotating are joined together to thereby form a hose.

SPECIFICATION

Field of the invention

This invention relates to an apparatus for continuously making a hose, and more particularly to such an apparatus in which a hose having a coil of hard resilient wire disposed inwardly thereof or embedded therein may be manufactured smoothly and continuously with a high reliability, and which is selectively operable with ease for the manufacture of such inner wire type hose or embedded wire type hose as desired.

SUMMARY OF THE INVENTION

It is the primary object of the present invention to provide an apparatus for continuously making a hose of the foregoing character, which apparatus comprises a base, a plurality of equally spaced rolls of an equal diameter having their respective axes disposed on the periphery of a common circle in such a manner that said rolls collectively provide basis of a cylindrical surface along their outward peripheries, said plurality of rolls being mounted projectedly on a vertical wall member on said base in a cantilever fashion; each of said rolls having a plurality of equidistantly axially spaced, annular grooves formed circumferentilly thereof, but with the grooves on each of said rolls being disposed so that they are axially offset ahead of the corresponding grooves on the preceding roll, when the rolls are viewed in the direction of rotation or transversely to the longitudinal axis of rotation of the rolls, the amount of offset being a dimension derived by dividing the distance between the axially adjacent grooves by the number of said rolls, and said rolls being driven by means to rotate them in the same direction and at the same velocity. The apparatus further comprises a base frame movable axially of said rolls and adapted to be fixed on said base, and a plurality of wire deformation rolls disposed on said base frame in such a manner that these wire deformation rolls collectively provide a circular surface or pathway constituted by or along their inward peripheries, said circular surface pathway being smaller in diameter than said cylindrical surface provided for hose shaping by said first-named rolls so that the smaller diameter pathway is generally concentrically disposed within the latter cylindrical surface.

In using the apparatus of the present invention outlined above, a hard resilient wire is forcedly supplied between the rolls toward the inward periphery of the deformation roll and is thereby deformed into a curve of a great curvature, whereafter the wire thus curved is passed into the grooves on the outwardly disposed rolls so as to be shaped into a coil of a desired diameter. Utilizing the helical forward movement of such coil toward the forward end of the rolls, a tape-like hose wall material having suitable tackiness is then entrained helically onto the rotating coil to form a hose. The hose thus produced is removed from the forward end of the rolls. The base frame of the coil shaping means may be suitably moved so that an inner lining material to be applied to the inner surface of the coil may be supplied for its processing or that the time for the coil shaping and the hose wall applying steps may be adjusted.

BRIEF DESCRIPTION OF THE DRAWINGS

The invention will now be descibed in greater detail with respect to an embodiment thereof as shown in the accompanying drawings, in which:

FIG. 1 is a side view of the apparatus provided according to the present invention;

FIG. 2 is a vertical sectional view taken along line II—II of FIG. 1;

FIG. 3 is a front view showing the manner in which the wire is formed into a coil;

FIG. 4 is a front view of the major portion of the apparatus during the manufacture of an inner wire type hose;

FIG. 5 is an enlarged, fragmentary side view, shown partially in longitudinal cross section, of the FIG. 4 portion;

FIG. 6 is a front view of the major portion of the apparatus during the manufacture of a modified embedded wire type hose; and FIG. 7 is an enlarged, fragmentary side view, shown partially in longitudinally cross section, of the FIG. 6 portion.

DESCRIPTION OF THE PREFERRED EMBODIMENTS

Referring now to the drawings, the apparatus for continuously making a hose according to the present invention is provided with a base 1, and a reduction gear housing 2 mounted on said base over a part of its upper surface. Said base 1 has rails 12 integrally formed on the upper opposite sides thereof as best seen in FIG. 2. A bearing plate 3 is supported generally parallel with and offset with respect to the front vertical wall of the reduction gear housing 2 by means of a support rod 4 to which the plate 3 is locked by a nut 5. A plurality of rolls 6 are provided which constitutes the major portion of the apparatus of the present invention. In the illustrated embodiment, provision is made of six such rolls extending from the reduction gear housing 2 and all these rolls 6 are equal in diameter. As shown in FIGS. 2, 3, 4 and 6, these six rolls are arranged in equally spaced relationship with one another and with their axes disposed on the periphery of a common circle in such a manner that the rolls collectively provide along their radially outwardmost peripheries a basis for a cylindrical surface for shaping the wire material into a cylindrical coil or hose. Each of said rolls 6 has a plurality of annular grooves 7 formed peripherally thereof in axially equidistant relationship and having a semi-circular cross section. As best seen in FIG. 1, these grooves 7 are disposed in such a manner that the grooves on each roll are successively axially offset ahead of the grooves on the preceding roll, as viewed clockwise in FIG. 2, with the amount of offset being a distance equal to one-sixth of the pitch of each groove, and thus a full rotation of all rolls causes the material thereon to advance by a distance equal to the pitch of the groove. Provision is also made of pulley 8 and a drive belt 9 connecting said pulley 8 to a prime mover (not shown), so that the drive is transmitted through said belt and pulley and further through suitable reduction gearing in the housing 2 to each of the rolls 6 which are in turn rotated clockwise at an equal velocity. There is also provided in the coil shaping portion of the apparatus a vertical base frame 10 which is formed, as shown in FIG. 2, with a circular center opening 14 through which said rolls 6 extend horizontally. The frame 10 has an extension including embrace legs 11 which depend from the lower opposite sides of the frame 10. These legs 11 are guided to slide back and forth along rails 12 so that the frame 10 is also moved as a unit with the legs. A pair of bolts 13 is provided to lock the respective legs 11 in a suitable position on the base 1. On the front face of the frame 10 is provided a plurality of wire deformation means 17 disposed around the circular opening 14. Each of these wire deformation means 17 has a wire deformation roll 18 journalled thereto at the inner end thereof, and as best shown in FIG. 2, the roll 18 on each of said wire deformation means 17 is adjustable of its position by a screw 19. Also, as shown in FIG. 3, these rolls 18, except the uppermost one which serves as a guide roll, are arranged in such a manner that they collectively provide a basis for defining a circular surface along their inward peripheries. Said circular surface provided by the rolls 18 is greater in curvature and therefore has a smaller diameter than the previously mentioned cylindrical surface provided by the aforementioned rolls 6, and the former circular surface is disposed generally concentrically within the latter cylindrical surface.

Idle guide rolls 15 are provided which extend from the forward vertical wall of the reduction gear housing 2 through the circular opening 14 formed in the base frame 10, and each of these idle guide rolls 15 is opposed centrally between and radially inwardly of a respective corresponding pair of said deformation rolls 18. Provision is also made for a supply guide roll 16 also disposed on the front face of the frame 10 in opposed relationship with a wire supply device (not shown).

In operation, if a hard resilient wire W is supplied from the wire supply device through the guide roll 16 in the direction as shown by the arrow in FIG. 3, then the wire W is deformed into a curve by the collective action of the circumferentially spaced wire deformation rolls 18 helped by idle rolls 15 and passes onto the more outwardly disposed rolls 6 to fit into the grooves 7 formed on the rolls 6, whereby the wire W is shaped into a coil of a predetermined pitch and curvature as shown in FIGS. 4 and 5. The wire thus shaped into such coil is driven to slide on the surface of the grooves 7 with the help of the friction drive provided by the groove surfaces of the rotating rolls 6 as well as with the aid of the drive force from the wire supply device, and thus the wire coil is smoothly moved forward while rotatively coiling along the path provided by the grooves 7. If a soft tape T, such as one made of vinyl chloride, is entrained on such moving wire coil at a suitable location thereof, the wire coil serves as a kind of conveyor belt whereby there is provided from the forward end of the rolls 6 a type of hose having an inwardly exposed wire, as shown in FIG. 5.

In the above-described arrangement, if the base frame 10 is locked in its rearwardmost position it thereby provides the greatest possible space on rolls 6 for the coil and hose shaping. Thus, the size of the space available for hose shaping can be suitably adjusted in accordance with the type of the material used for the hose wall.

Also, if it is desired to fully embed the wire coil in the hose wall material, such embedding may be accomplished by locking the base frame 10 in a relatively forward position as shown in FIG. 1, and entraining the hose wall material onto the rolls 6 prior to the shaping of the wire into a coil. Alternatively, if a sponge tape S is entrained onto the rolls 6 by the use of a wire conveyor C as shown in FIGS. 6 and 7, there can readily be produced an embedded wire type hose having an inner sponge wall.

While the present invention has been shown and described with respect to a specific embodiment thereof, it will be apparent to those skilled in the art that changes and modifications in various parts are possible without departing from the spirit and scope of the invention as defined in the appended claims.

What we claim is:

1. An apparatus for continuously making a hose comprising a base; a roll-supporting wall member mounted transversely on said base; a plurality of equally spaced rotatable rolls of an equal diameter having their respective axes circumferentially disposed on the periphery of a common circle in such a manner that said rolls collectively provide a basis for forming a cylindrical surface constituted along their outward peripheries; said plurality of rolls each having one end mounted projectedly in a cantilever fashion on said wall provided on said base; each of said rolls having a plurality of equidistantly spaced annular grooves formed circumferentially thereof, the grooves on each of said rolls being successively offset axially ahead of those corresponding grooves on the preceding roll, when the order of the rolls is viewed transversely to the longitudinal axis such as in the elevational direction of rotation of the rolls, the amount of offset being a dimension derived by dividing the distance between axially adjacent grooves by the number of said rolls; means for driving said rolls to rotate all in the same direction and at the same velocity, so that when operatively rotating a hard resilient wire supplied into said grooves on said rolls is formed into a spiraling coil while an elongated strip of hose wall material having a tacky surface on at least one side is entrained onto said wire, whereby the adjacent edges of said hose wall material as helically rotating with the movement of said coil are joined together due to the tackiness of the material to thereby form a hose; said apparatus further comprising a frame adapted to be movable axially of said rolls and movably mounted on said base, and cooperative means on said base and on said base-mounted frame to facilitate said movement; said frame having portions disposed radially outwardly of said cantilever mounted rotatable rolls; a plurality of wire-deformation rolls disposed on said base-mounted frame portions in such a manner that these wire-deformation rolls collectively provide a basis for establishing a generally circular surface by and along their radially inward peripheries; said latter circular surface being smaller in diameter than said cylindrical surface provided for hose shaping by said first-named cantilever mounted rolls so that the former circular surface is disposed generally concentrically within the latter cylindrical surface, whereby said wire forming said hose is fed initially to engage and form against the inner peripheries of said second-mentioned rolls and subsequently is continuously directed around said first-mentioned rolls in the grooves thereof as heretofore stated.

2. Apparatus as defined in claim 1 wherein said second-mentioned rolls as mounted on said movably mounted frame are mounted to be respectively alternately interspersed circumferentially between said first-mentioned rolls mounted in cantilever fashion.

3. Apparatus as defined in claim 1 wherein said second-mentioned rolls have means associated therewith to mount them for rotation about their center axis.

4. Apparatus as defined in claim 1 further comprising means associated with said second mentioned rolls to mount them for adjustment in a radial manner relative to said first-mentioned rolls.

5. Apparatus as defined in claim 1 wherein said second mentioned rolls each have annular peripheral grooves like those of said first mentioned rolls, said grooves of both sets of rolls being of a depth approximating but not in excess of one half the diameter of the wire used in forming said hose.

6. Apparatus as defined in claim 1 further including a pair of idler rolls projecting from said transverse wall in parallel to both sets of rolls, and idler rolls mounted radially inwardly of adjacent pairs of said second-mentioned rolls and adapted to receive said hose-forming wire between the outer periphery of said idler rolls and the inner periphery of said second-mentioned rolls during the initial wire feeding and forming of said hose.

References Cited

UNITED STATES PATENTS

| | | | |
|---|---|---|---|
| 3,192,088 | 6/1965 | Lariviere | 156—436 X |
| 2,177,054 | 10/1939 | Catini | 140—92.93 |

FOREIGN PATENTS

| | | | |
|---|---|---|---|
| 597,626 | 1/1948 | Great Britain | 156—436 |

BENJAMIN A. BORCHELT, Primary Examiner

G. E. MONTONE, Assistant Examiner

U.S. Cl. X.R.

140—92.93